(12) United States Patent
Fang et al.

(10) Patent No.: US 10,453,493 B2
(45) Date of Patent: Oct. 22, 2019

(54) METHOD AND APPARATUS FOR RECORDING AND REPLAYING VIDEO OF TERMINAL

(71) Applicant: Tencent Technology (Shenzhen) Company Limited, Guangdong Province (CN)

(72) Inventors: Liang Fang, Guangdong Province (CN); Peng Wang, Guangdong Province (CN); Dejun Zhang, Guangdong Province (CN); Dawei Sun, Guangdong Province (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 485 days.

(21) Appl. No.: 15/288,721

(22) Filed: Oct. 7, 2016

(65) Prior Publication Data

US 2017/0025155 A1    Jan. 26, 2017

Related U.S. Application Data

(63) Continuation of application No. PCT/CN2015/075791, filed on Apr. 2, 2015.

(30) Foreign Application Priority Data

Apr. 10, 2014    (CN) .......................... 2014 1 0141110

(51) Int. Cl.
*G11B 27/031*    (2006.01)
*H04N 21/4223*    (2011.01)
(Continued)

(52) U.S. Cl.
CPC ............ *G11B 27/031* (2013.01); *G06F 11/00* (2013.01); *G06F 11/3668* (2013.01);
(Continued)

(58) Field of Classification Search
CPC ....... G11B 27/031; G11B 27/34; G06F 11/00; G06F 11/3668; H04N 21/4223;
(Continued)

(56) References Cited

U.S. PATENT DOCUMENTS

2006/0087987 A1*  4/2006  Witt ..................... H03M 7/30
                                                        370/260
2009/0149078 A1   6/2009  Kondo et al.
(Continued)

FOREIGN PATENT DOCUMENTS

CN           1627732 A      6/2005
CN         101005595 A      7/2007
(Continued)

OTHER PUBLICATIONS

International Search Report for Application No. PCT/CN2015/075791, dated Jul. 6, 2015, 2 pages.

*Primary Examiner* — Thai Q Tran
*Assistant Examiner* — Sunghyoun Park
(74) *Attorney, Agent, or Firm* — Venable LLP; Jeffri A. Kaminski

(57) ABSTRACT

A method and an apparatus for recording and replaying a video of a terminal are described, which can solve a problem, which is caused by failure to continuously reflect a running status of a program, of low efficiency of recording and replaying the video of the terminal. The method includes: receiving screenshots that are sent by a terminal according to a first preset time interval and performance data of the terminal that is sent by the terminal according to a second preset time interval, wherein the first preset time interval is less than the second preset time interval; synthesizing the received screenshots into video data that has a start time and an end time; and playing, according to a playback time selected by a user, the video data and the performance data corresponding to the playback time.

15 Claims, 7 Drawing Sheets

(51) Int. Cl.
*H04N 21/4402* (2011.01)
*H04N 21/442* (2011.01)
*G06F 11/00* (2006.01)
*G06F 11/36* (2006.01)
*G11B 27/34* (2006.01)
*H04N 17/00* (2006.01)

(52) U.S. Cl.
CPC ......... *G11B 27/34* (2013.01); *H04N 21/4223* (2013.01); *H04N 21/4402* (2013.01); *H04N 21/442* (2013.01); *H04N 21/4424* (2013.01); *H04N 21/440236* (2013.01); *H04N 17/00* (2013.01)

(58) Field of Classification Search
CPC ....... H04N 21/4402; H04N 21/440236; H04N 21/442; H04N 21/4424; H04N 17/00
See application file for complete search history.

(56) References Cited

U.S. PATENT DOCUMENTS

| | | | |
|---|---|---|---|
| 2009/0150868 A1* | 6/2009 | Chakra | G06F 11/3692 717/125 |
| 2009/0204382 A1 | 8/2009 | Tung et al. | |
| 2010/0031162 A1* | 2/2010 | Wiser | G06Q 30/0255 715/747 |
| 2010/0144443 A1* | 6/2010 | Graham | A63F 13/60 463/42 |
| 2011/0007797 A1* | 1/2011 | Palmer | G11B 27/034 375/240.01 |
| 2012/0140081 A1 | 6/2012 | Clements | |
| 2012/0236201 A1* | 9/2012 | Larsen | G06Q 10/10 348/468 |
| 2013/0215292 A1* | 8/2013 | Reichelt | G06T 11/00 348/239 |
| 2014/0155022 A1* | 6/2014 | Kandregula | G06Q 50/01 455/405 |
| 2014/0280913 A1* | 9/2014 | Karren | H04L 41/0806 709/224 |

FOREIGN PATENT DOCUMENTS

| | | |
|---|---|---|
| CN | 101282247 A | 10/2008 |
| CN | 101399967 A | 4/2009 |
| CN | 101482849 A | 7/2009 |
| CN | 102279739 A | 12/2011 |
| CN | 102609637 A | 7/2012 |
| CN | 102708049 A | 10/2012 |
| CN | 103516559 A | 1/2014 |

* cited by examiner

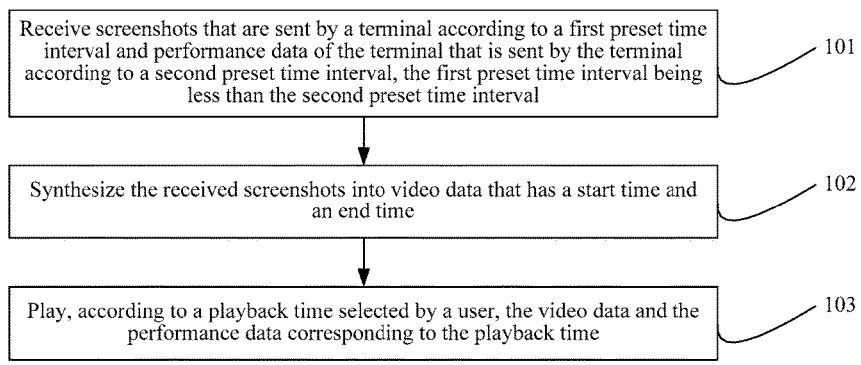
FIG. 1
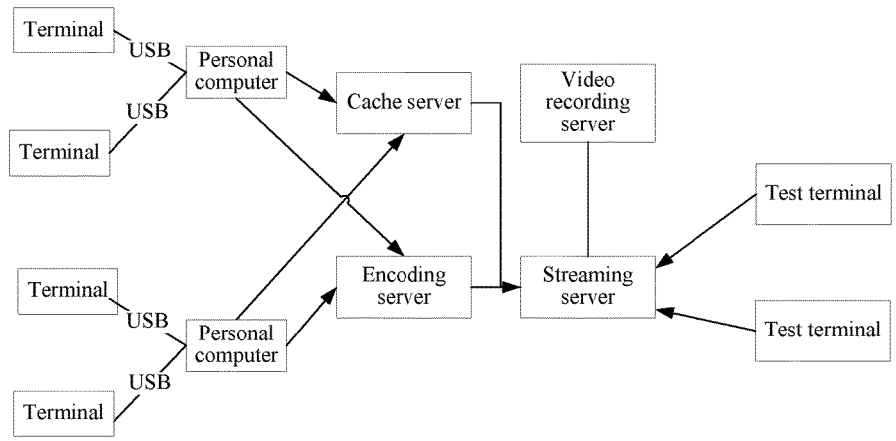
FIG. 2-a

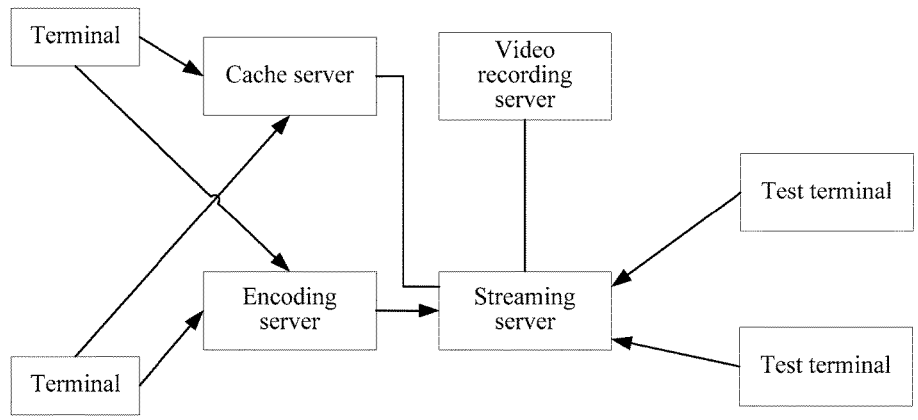
FIG. 2-b
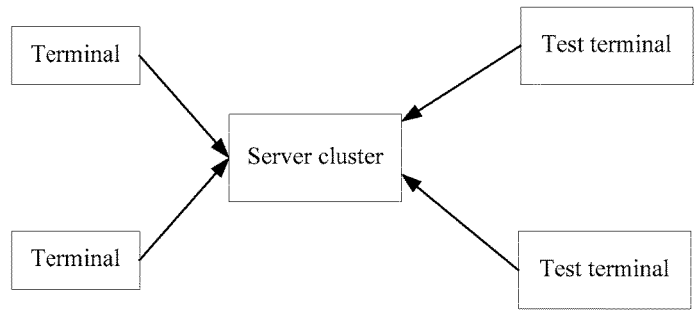
FIG. 2-c
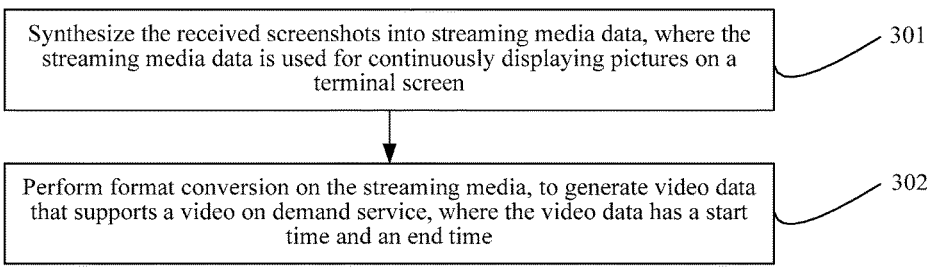
FIG. 3

METHOD AND APPARATUS FOR RECORDING AND REPLAYING VIDEO OF TERMINAL

PRIORITY CLAIM AND RELATED APPLICATIONS

This application is a continuation of International Application No PCT/CN2015/075791, entitled "Method and Apparatus for Recording and Replaying Video of Terminal" filed on Apr. 2, 2015, which claims priority to Chinese Patent Application No. 201410141110.X, entitled "Method and apparatus for recording and replaying video of terminal" filed on Apr. 10, 2014, both of which are incorporated by reference in their entirety.

TECHNICAL FIELD

The present disclosure relates to the field of recording and replaying of videos of terminals, and in particular, to a method and an apparatus for recording and replaying a video of a terminal.

BACKGROUND

With the development of intelligent terminals, software development for the intelligent terminals is also increased accordingly. During software development, it needs to collect statistics on and replay a running condition of software (for example, a game) on the intelligent terminals, thereby facilitating programmers to improve and maintain the software.

Currently, video recording in an intelligent terminal generally uses the following method: acquiring a screenshot of an interface of the terminal at a preset time point, such as every 5 minutes, and simultaneously acquiring a performance indicator parameter of the terminal at the preset time point; and when a user needs to play a recorded product, playing screenshots of the interface and performance indicator parameters corresponding thereto according to a time sequence.

However, as the screenshots of the interface acquired at the preset time points are static pictures, when displaying the screenshots of the interface and the corresponding performance indicator parameters, a running status of a program cannot be continuously reflected, and only a running status for static pictures can be obtained. As a result, details of each picture of the intelligent terminal during running of the software cannot be obtained, which means that a running condition of the software on the intelligent terminal cannot be continuously and accurately reflected, leading to careless omission of a running exception point during recording and replaying of a video of the terminal.

SUMMARY

Embodiments of the present disclosure provide a method and an apparatus for recording and replaying a video of a terminal, which can solve a problem, which is caused by failure to continuously reflect a running condition of a program, of careless omission of a running exception point during recording and replaying of the video of the terminal.

According to one aspect, a method for recording and replaying a video of a terminal is provided, including:

receiving screenshots that are sent by the terminal according to a first preset time interval and performance data of the terminal that is sent by the terminal according to a second preset time interval, wherein the first preset time interval is less than the second preset time interval;

synthesizing the screenshots received into video data that has a start time and an end time; and playing, according to a playback time selected by a user, the video data and the performance data corresponding to the playback time.

According to another aspect, an apparatus for recording and replaying a video of a terminal is provided, including:

a receiving unit, configured to receive screenshots that are sent by the terminal according to a first preset time interval and performance data of the terminal that is sent by the terminal according to a second preset time interval, wherein the first preset time interval is less than the second preset time interval;

a synthesizing unit, configured to synthesize the screenshots received by the receiving unit into video data that has a start time and an end time; and a playback unit, configured to play, according to a playback time selected by a user, the video data obtained through synthesis by the synthesizing unit and the performance data received by the receiving unit and corresponding to the playback time.

According to still another aspect, a non-transitory computer readable storage medium having stored therein one or more instructions is provided, which, when executed by a server, causes the server to: receive screenshots that are sent by a terminal according to a first preset time interval and performance data of the terminal that is sent by the terminal according to a second preset time interval, wherein the first preset time interval is less than the second preset time interval; synthesize the received screenshots into video data that has a start time and an end time; and play, according to a playback time selected by a user, the video data and the performance data corresponding to the playback time.

According to the method and the apparatus for recording and replaying a video of a terminal are provided, screenshots that are sent by a terminal according to a first preset time interval and performance data that is sent by the terminal according to a second preset time interval can be received; the screenshots are synthesized into video data; and then, according to a playback time selected by a user, video pictures of the terminal are played and the performance data corresponding to the playback time is displayed simultaneously. In the present disclosure, the screenshots are synthesized into the video data, thereby obtaining continuous running effects of the terminal; and continuous video data can reflect performance data corresponding to each time point, thereby avoiding careless omission of an exception point and improving the efficiency of recording and replaying the video of the terminal.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

FIG. 1 is a flowchart of a method for recording and replaying a video of a terminal according to an embodiment of the present disclosure;

FIG. 2-*a* is a schematic architectural diagram of a system for recording and replaying a video of a terminal according to an embodiment of the present disclosure;

FIG. 2-*b* is a schematic architectural diagram of a system for recording and replaying a video of a terminal according to an embodiment of the present disclosure;

FIG. 2-*c* is a schematic architectural diagram of a system for recording and replaying a video of a terminal according to an embodiment of the present disclosure;

FIG. 3 is a flowchart of a method for recording and replaying a video of a terminal according to an embodiment of the present disclosure;

DESCRIPTION OF EMBODIMENTS

Figure 4:
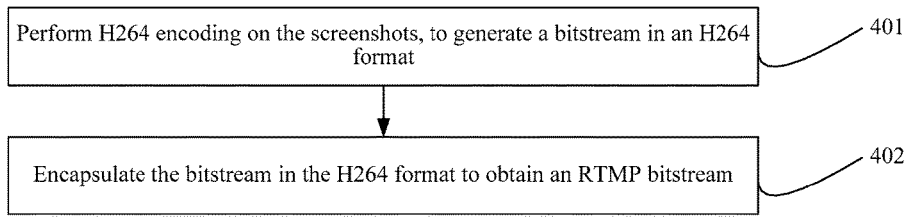
FIG. 4 is a flowchart of a method for recording and replaying a video of a terminal according to an embodiment of the present disclosure.

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The method as disclosed as follows may be implemented by any appropriate computing device having one or more processors and a memory. The computing device, used herein, may refer to any appropriate device with certain computing capabilities (for example, of controlling media data to be placed at a constant speed), such as a personal computer (PC), a work station computer, a hand-held computing device (tablet), a mobile terminal (a mobile phone or a smart phone), a server, a network server, an intelligent terminal, or any other user-side or server-side computing device. The memory includes a storage medium, which may further include memory modules, for example, a Read-Only Memory (ROM), a Random Access Memory (RAM), and flash memory modules, and mass storages, for example, a CD-ROM, a U-disk, a removable hard disk, and so on, which are all non-transitory storage mediums. The storage medium may be a non-transitory computer readable storage medium that stores computer programs for implementing various processes, when executed by the processors. In the embodiments, the computing device is a server described below.

An embodiment of a method for recording and replaying a video of a terminal is provided. As shown in FIG. 1, the method includes:

Step 101: Receive screenshots that are sent by a terminal according to a first preset time interval and performance data of the terminal that is sent by the terminal according to a second preset time interval, wherein the first preset time interval is less than the second preset time interval.

The performance data is used for describing at least one of the following performance parameters: central processing unit (CPU) usage, memory usage, traffic usage, power consumption, and the number of frames per second (FPS) of an image on the screen.

The CPU usage includes CPU utilization; the memory usage includes a size of memory that has been used, a size of remaining memory, and the like; and the traffic usage includes generated traffic consumption.

Preferably, the first time interval is greater than 0 seconds and less than or equal to 100 milliseconds; and the second time interval is greater than or equal to 2 seconds.

Further, the first time interval is 50 to 100 milliseconds, and the second time interval is 2 seconds.

The screenshots are sent by using 50 to 100 milliseconds as the first time interval, which can enable generated video data to be continuous. In addition, too much traffic is not generated due to an excessively short time interval.

Further, the terminal may compress a picture, and send the compressed picture, so as to further reduce the traffic.

Step 102: Synthesize the received screenshots into video data that has a start time and an end time.

The screenshots are synthesized into the video data according to a sequence of receiving the screenshots. Duration determined based on the start time and the end time is total duration of the video data.

Step 103: Play, according to a playback time selected by a user, the video data and the performance data corresponding to the playback time.

The user selects a playback time on a playback interface of the video data. A frame of the video data corresponding to the playback time and the performance data corresponding to the playback time are invoked. A representative function of the performance data is generated in a fitted manner, and then a graphical curve of the performance data is drawn according to a fitting function.

According to the method for recording and replaying a video of a terminal provided by this embodiment of the present disclosure, screenshots that are sent by a terminal according to a first preset time interval and performance data that is sent by the terminal according to a second preset time interval can be received; the screenshots are synthesized into video data; and then, according to a playback time selected by a user, video pictures of the terminal are played and the performance data corresponding to the playback time is displayed simultaneously. In the existing technology, a running condition of software on a terminal can only be determined according to pictures, but a continuous running status cannot be obtained, leading to careless omission of a running exception point during recording and replaying of a video of the terminal. In the present disclosure, the screenshots are synthesized into the video data, thereby obtaining continuous running effects of the terminal and improving the efficiency of recording and replaying the video of the terminal.

In this embodiment of the present disclosure, used system architectures are shown in FIG. 2-*a* and FIG. 2-*b*. A difference between FIG. 2-*a* and FIG. 2-*b* lies in that, data is directly sent by a terminal to an encoding server in FIG. 2-*b*, while in FIG. 2-*a*, data is sent by a terminal to an encoding server by using a PC. When sending the data to the encoding server, the terminal may transmit the data by using a wired network. FIG. 2-*a* is used as an example. Multiple terminals (such as smart phones) are connected to a PC by using a USB. The PC sends screenshots of the terminals to the encoding server. The encoding server receives the screenshots that are sent by the terminals by using the PC. In addition, the terminals send performance data to a cache server by using the PC. The encoding server synthesizes the screenshots uploaded by each terminal to obtain streaming media data, which is in a one-to-one correspondence to each terminal, in a Routing Table Maintenance Protocol (RTMP) format, and sends the streaming media to a streaming server. A video recording server reads the streaming media data from the streaming server, and performs format conversion on the streaming media data, to obtain video data in a flash video (FLV) format, and stores the video data in the streaming server. A tester may send a request for playing the streaming media data from different terminals to a Web server, and the Web server accesses the streaming server according to the playing request. The streaming server synchronizes the performance data and the video data according to the time when playing the video data, to obtain a chart of performance parameters corresponding to running conditions of the terminals. When the tester tests the running conditions of the terminals according to the video data, the tester can more accurately test a running condition at each time point, and can further view running conditions between two adjacent time points, thereby improving testing efficiency.

It should be noted that, the encoding server, the streaming server, the cache server and the video recording server in this embodiment of the present disclosure may be multiple servers in a server cluster that are separately configured to perform different functions. Therefore, this embodiment of the present disclosure may also be implemented by using a server cluster.

Optionally, the method shown in FIG. 1 is implemented by multiple functional modules in a server. In this case, a system architecture used in this embodiment of the present disclosure is shown in FIG. **2-*c***.

An embodiment of the present disclosure further provides a method for recording and replaying a video of a terminal. As a specific description of the method shown in FIG. 1, as shown in FIG. 3, step 102 of synthesizing the received screenshots into video data that has a start time and an end time includes:

Step 301: Synthesize the received screenshots into streaming media data, where the streaming media data is used for continuously displaying pictures on a display screen of the terminal.

Preferably, a data type of the streaming media data is an RTMP video stream format. For an RTMP video stream, multiple actual pictures, that is, the screenshots, can be synthesized into a piece of media stream data. However, as the RTMP is a protocol used for real-time streaming media transmission, a video on demand function is not provided in the RTMP, which means the streaming media data can only be played from start to end, but cannot be played from a middle position.

Specifically, as shown in FIG. 4, step 301 includes:

Step 401: Perform H264 encoding on the screenshots, to generate a bitstream in an H264 format.

In order to generate continuous stream media from discrete pictures, an active frame interpolation algorithm is used during encoding to generate the bitstream in the H264 format.

Step 402: Encapsulate the bitstream in the H264 format to obtain an RTMP bitstream.

The foregoing encoding server performs step 401 and step 402. The encoding server performs H264 encoding on the pictures uploaded by the terminal, and outputs the H264 bitstream. Then, the H264 bitstream is encapsulated into the RTMP bitstream. Finally, the RTMP bitstream is sent to the streaming server. A user accesses the RTMP bitstream in the streaming server by using the streaming server or the Web server.

Step 302: Perform format conversion on the streaming media data, to generate video data that supports a video on demand service, where the video data has a start time and an end time.

In order to enable a tester to play the video data on demand, the format conversion is performed on the streaming media data to obtain the video data that supports the video on demand service.

Preferably, the format of the video data is an FLV format.

Preferably, an RTMPDump tool is used to perform a format conversion operation.

Figure 5:
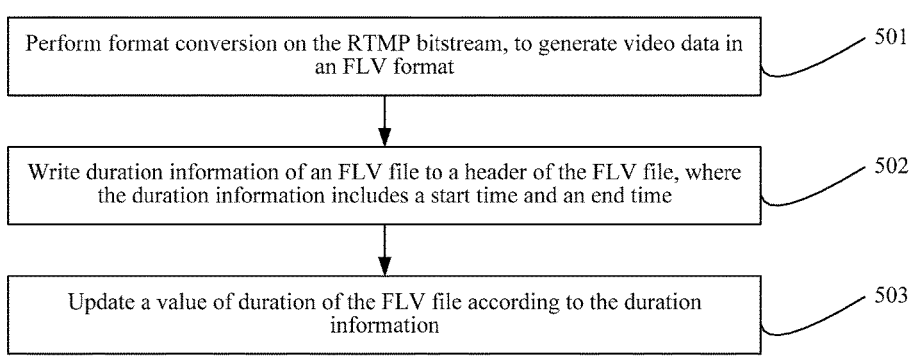
FIG. 5 is a flowchart of a method for recording and replaying a video of a terminal according to an embodiment of the present disclosure.

Specifically, as shown in FIG. 5, step 302 includes:

Step 501: Perform format conversion on the RTMP bitstream, to generate video data in an FLV format.

The RTMPDump tool is generally installed in a streaming server. Access to the RTMPDump tool in the streaming server can implement conversion of the RTMP bitstream into the FLV format.

Steps for the RTMP bitstream are described as follows by using commands used by the RTMPDump tool:

1. Acquire an address of an RTMP video stream,
   for example: rtmp://10.1.163.35:8080/live/10235,
   where 10.1.163.35 denotes a website of the streaming server, 8080 denotes a port, live denotes a name of a folder in which the RTMP video stream is located, and 10235 denotes a name of a file of the RTMP video stream.

2. Use an RTMPDump command to perform format conversion on the RTMP video stream, to obtain an FLV file.
   The RTMPDump command may be, for example, RTMPDump-r rtmp://10.1.163.35:8080/live/10235-v-o 10235.flv.

Step 502: Write duration information of an FLV file to a header of the FLV file, where the duration information includes a start time and an end time.

The header of the FLV file obtained by conversion by the RTMPDump tool does not include the duration information (the start time and the end time) of the video. During replaying, if the duration information of the video does not exist, the video cannot be played on demand according to the time.

Therefore, it needs to actively write the duration information of the video to the header of the FLV file.

Step 503: Update a value of duration of the FLV file according to the duration information.

The value of duration of the FLV file is updated, so that when the FLV file is replayed in a Flash player, a progress bar can be used to control a time point for playback, thereby achieving the video on demand service.

According to the method for recording and replaying a video of a terminal provided by this embodiment of the present disclosure, multiple screenshots sent by a terminal can be synthesized into streaming media data, and then format conversion is performed on the streaming media data, to obtain video data that supports a video on demand service. Therefore, a tester can observe a running condition of software from the video data at a time point in the middle, so as to avoid watching the video data from the start, thereby improving the efficiency of recording and replaying the video of the terminal.

An embodiment of the present disclosure further provides a method for recording and replaying a video of a terminal. As a specific description of the method shown in FIG. 3, step 301 of synthesizing the screenshots received into streaming media data, where the streaming media data is used for continuously displaying pictures on a display screen of the terminal includes:

separately creating a sub-process for each terminal, where the sub-process is used for performing format conversion on streaming media data corresponding to each terminal.

A parent process of the sub-process is a format conversion process. Each sub-process corresponds to one terminal. Each sub-process separately records an RTMP bitstream and saves the RTMP bitstream as an FLV file.

Optionally, after the start time and the end time are added to the video data, a memory control of the sub-process is released.

According to the method for recording and replaying a video of a terminal provided by this embodiment of the present disclosure, sub-processes can be created for different terminals, which facilitates management by using the sub-processes; and multiple pieces of video data can be generated in parallel, thereby improving testing efficiency.

Figure 6:
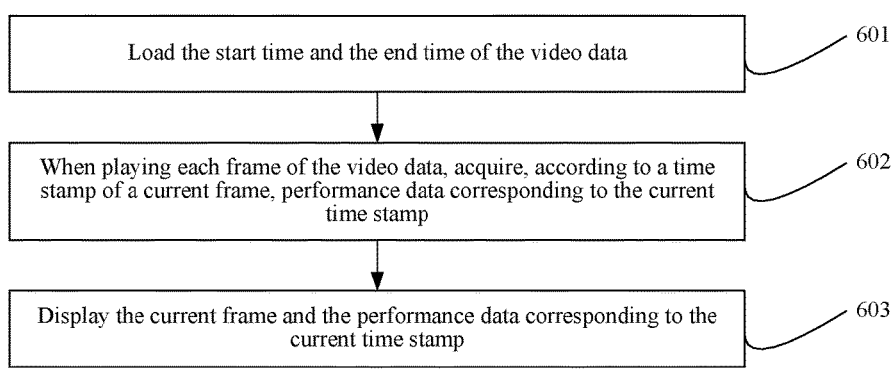
FIG. 6 is a flowchart of a method for recording and replaying a video of a terminal according to an embodiment of the present disclosure.

An embodiment of the present disclosure further provides a method for recording and replaying a video of a terminal. As a specific description of the method shown in FIG. 3, as shown in FIG. 6, step 103 of playing, according to a playback time selected by a user, the video data and the performance data corresponding to the playback time includes:

Step 601: Load the start time and the end time of the video data.

Step 602: When playing each frame of the video data, acquire, according to a time stamp of a current frame, performance data corresponding to the current time stamp.

Step 603: Display the current frame and the performance data corresponding to the current time stamp.

Figure 7:
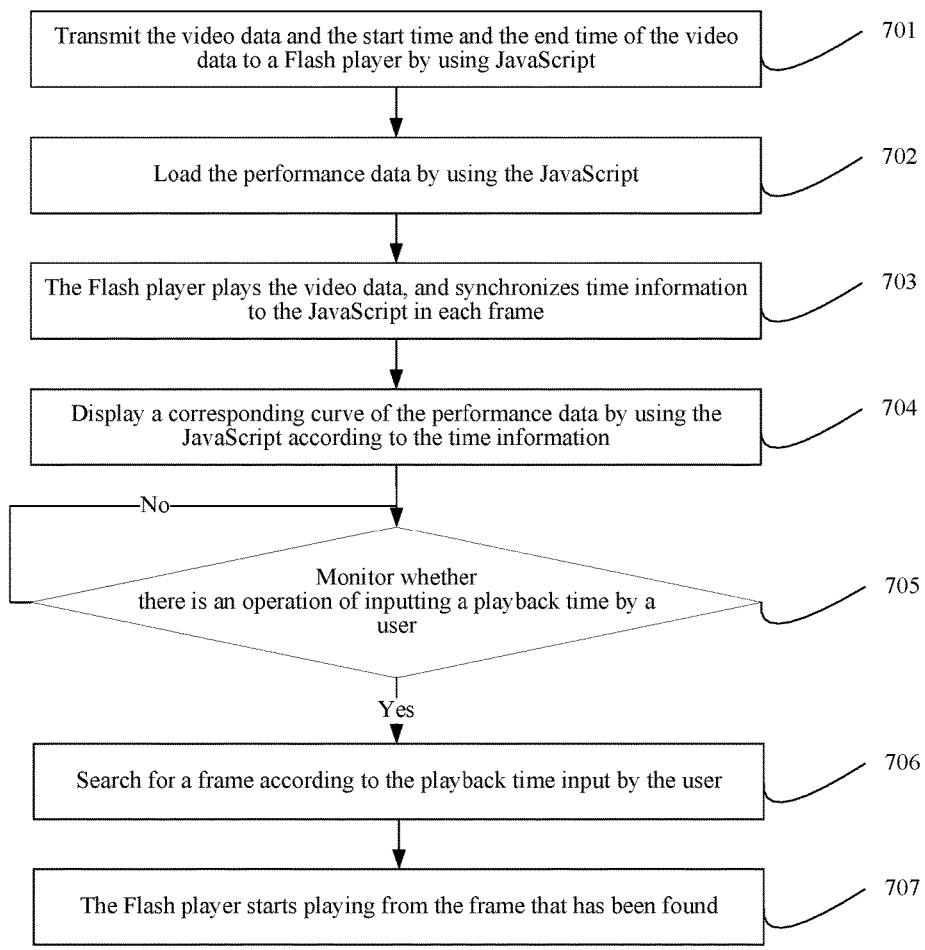
FIG. 7 is a flowchart of a method for recording and replaying a video of a terminal according to an embodiment of the present disclosure.

An embodiment of the present disclosure further provides a method for recording and replaying a video of a terminal. As a specific description of the method shown in FIG. 1, as shown in FIG. 7, Step 701: Transmit the video data and the start time and the end time of the video data to a Flash player by using JavaScript.

The Flash player may be separate multimedia playback software, or a plug-in of a browser.

Step 702: Load the performance data by using the JavaScript.

Step 703: The Flash player plays the video data, and synchronizes time information to the JavaScript in each frame.

Step 704: Display a corresponding curve of the performance data by using the JavaScript according to the time information.

Step 705: Monitor whether there is an operation of inputting a playback time by a user. If yes, perform step 706; and if not, continue the monitoring.

Step 706: Search for a frame according to the playback time input by the user.

Step 707: The Flash player starts playing from the frame that has been found.

According to the method for recording and replaying a video of a terminal provided by this embodiment of the present disclosure, video data can be played by using a Flash player and a JavaScript tool, and displayed pictures can be adjusted according to a playback time input by a tester.

Figure 8:
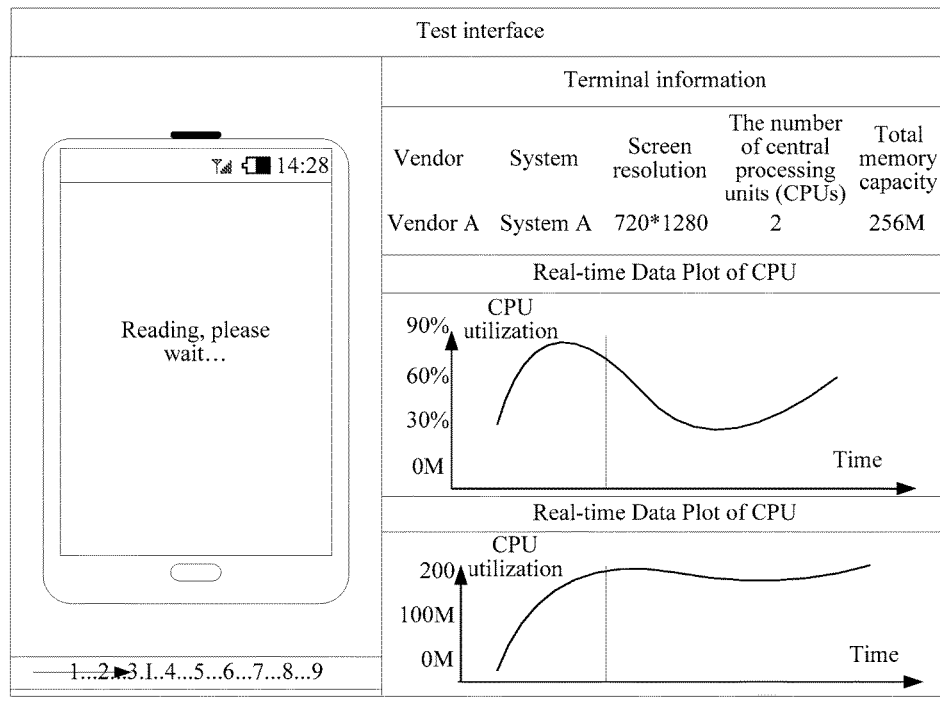
FIG. 8 is a schematic diagram of a display interface for recording and replaying a video of a terminal according to an embodiment of the present disclosure.

A test interface is shown in FIG. 8. A display box on the left displays a running status (playing by using a Flash player) of the terminal, and performance data corresponding to a time axis is shown on the right. The time axis is located at a lower left part, and a cursor and an arrow are used to indicate a position of a time frame that is running currently. Using CPU utilization and memory utilization as an example, changes in the CPU utilization with the time are presented by using the time axis and the CPU utilization, where a vertical line denotes a current time point, and the time point is the same as that of the time frame at the lower left part. Information of the tested terminal includes: a vendor is a vendor A, an operating system is a system A, a screen resolution is 720*1280, the number of CPUs is 2, and a total memory capacity is 256 M.

Figure 9:
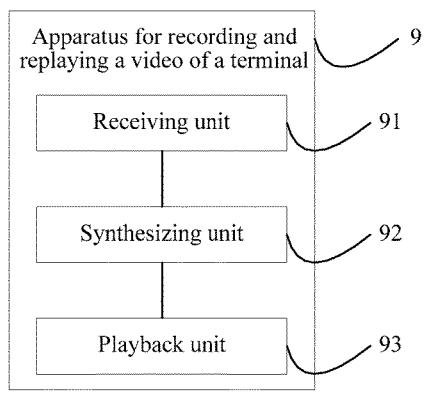
FIG. 9 is a schematic structural diagram of an apparatus for recording and replaying a video of a terminal according to an embodiment of the present disclosure.

An embodiment of the present disclosure further provides an apparatus 9 for recording and replaying a video of a terminal. As shown in FIG. 9, the apparatus 9 includes:

a receiving unit 91, configured to receive screenshots that are sent by a terminal according to a first preset time interval and performance data of the terminal that is sent by the terminal according to a second preset time interval, wherein the first preset time interval is less than the second preset time interval;

a synthesizing unit 92, configured to synthesize the screenshots received by the receiving unit 91 into video data that has a start time and an end time; and a playback unit 93, configured to play, according to a playback time selected by a user, the video data obtained through synthesis by the synthesizing unit 92 and the performance data received by the receiving unit 91 and corresponding to the playback time.

According to the apparatus for recording and replaying a video on a terminal provided by this embodiment of the present disclosure, the receiving unit 91 can receive screenshots that are sent by a terminal according to a first preset time interval and performance data that is sent by the terminal according to a second preset time interval; the synthesizing unit 92 synthesizes the screenshots into video data; and according to a playback time selected by a user, the playback unit 93 plays video pictures of the terminal and simultaneously displays the performance data corresponding to the playback time. In the existing technology, a running condition of software on a terminal can only be determined according to pictures, but a continuous running status cannot be obtained, leading to careless omission of a running exception point during recording and replaying of a video of the terminal. In the present disclosure, the screenshots are synthesized into the video data, thereby obtaining continuous running effects of the terminal and improving the efficiency of recording and replaying the video of the terminal.

Figure 10:
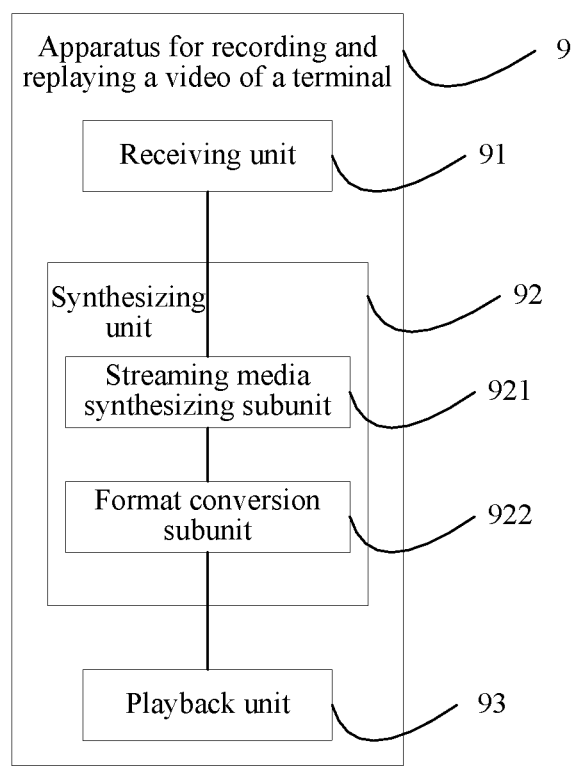
FIG. 10 is a schematic structural diagram of an apparatus for recording and replaying a video of a terminal according to an embodiment of the present disclosure.

An embodiment of the present disclosure further provides an apparatus 9 for recording and replaying a video of a terminal. As a specific description of the apparatus shown in FIG. 9, as shown in FIG. 10, the synthesizing unit 92 includes:

a streaming media synthesizing subunit 921, configured to synthesize the screenshots received by the receiving unit 91 into streaming media data, where the streaming media data is used for continuously displaying pictures on a display screen of the terminal; and a format conversion subunit 922, configured to perform format conversion on the streaming data obtained through synthesis by the streaming media synthesizing subunit 921, to generate video data that supports a video on demand service, where the video data has a start time and an end time.

An embodiment of the present disclosure further provides an apparatus 9 for recording and replaying a video of a terminal. As a specific description of the apparatus shown in FIG. 10, the streaming media synthesizing subunit 921 is further configured to:

perform H264 encoding on the screenshots, to generate a bitstream in an H264 format; and encapsulate the bitstream in the H264 format, to obtain an RTMP bitstream.

An embodiment of the present disclosure further provides an apparatus 9 for recording and replaying a video of a terminal. As a specific description of the apparatus shown in FIG. 10, the format conversion subunit 922 is further configured to:

perform format conversion on the RTMP bitstream, to generate video data in an FLV format;

write duration information of an FLV file to a header of the FLV file, where the duration information includes a start time and an end time; and update a value of duration of the FLV file according to the duration information.

According to the apparatus for recording and replaying a video of a terminal provided by this embodiment of the present disclosure, the synthesizing unit 92 synthesizes multiple screenshots that are sent by a terminal into streaming media data; the format conversion subunit can perform format conversion on the streaming media data, to obtain video data that supports a video on demand service. Therefore, a tester can observe a running condition of software from the video data at a time point in the middle, so as to avoid watching the video data from the start, thereby improving the efficiency of recording and replaying the video of the terminal.

An embodiment of the present disclosure further provides an apparatus 9 for recording and replaying a video of a terminal. As a specific description of the apparatus shown in FIG. 9, the synthesizing unit 92 is further configured to:

separately create a sub-process for each terminal, where the sub-process is used for performing format conversion on streaming media data corresponding to each terminal.

Optionally, after the start time and the end time are added to the video data, a memory control of the sub-process is released.

According to the apparatus for recording and replaying a video of a terminal provided by this embodiment of the present disclosure, the synthesizing unit 92 can create sub-processes for different terminals, which facilitates management by using the sub-processes; and multiple pieces of video data can be generated in parallel, thereby improving testing efficiency.

Figure 11:
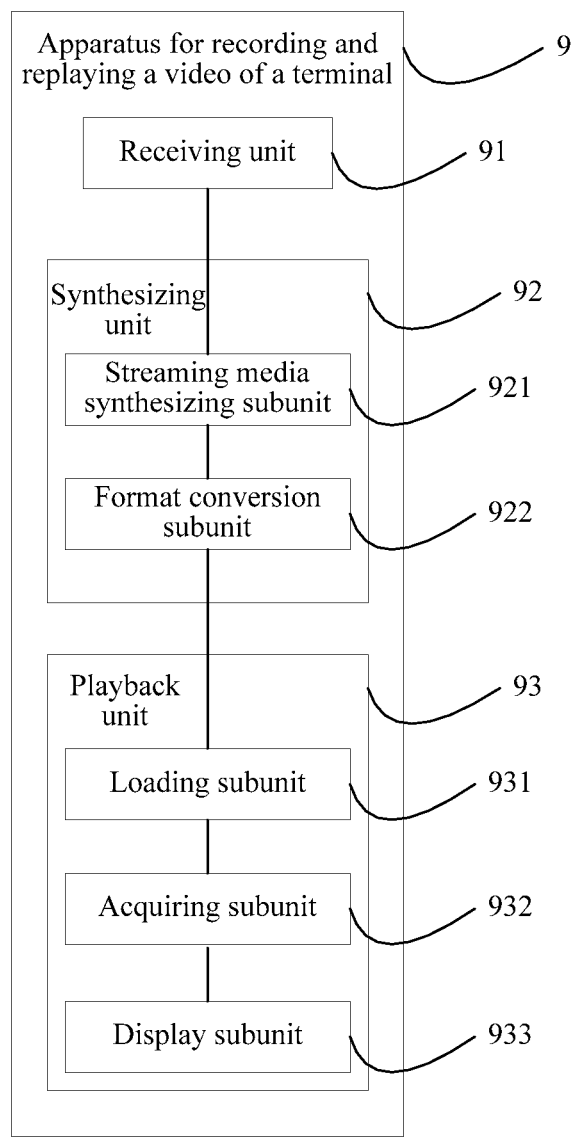
FIG. 11 is a schematic structural diagram of an apparatus for recording and replaying a video of a terminal according to an embodiment of the present disclosure.

An embodiment of the present disclosure further provides an apparatus 9 for recording and replaying a video of a terminal. As a specific description of the apparatus shown in FIG. 9, as shown in FIG. 11, the playback unit 93 further includes:

a loading subunit 931, configured to load the start time and the end time of the video data;

an acquiring subunit 932, configured to: when each frame of the video data is played, acquire, according to a time stamp of a current frame, performance data corresponding to the current time stamp; and a display subunit 933, configured to display the current frame and the performance data corresponding to the current time stamp.

Further, the performance data is used for describing at least one of the following performance parameters: CPU usage, memory usage, traffic usage, power consumption, and the number of FPS of an image on the screen.

Further, the first time interval is greater than 0 seconds and less than or equal to 100 milliseconds; and the second time interval is greater than or equal to 2 seconds.

The sequence numbers of the above embodiments of the disclosure are only for the purpose of description, and do not represent that one embodiment is superior to another.

It may be clearly understood by a person skilled in the art that, for the purpose of convenient and brief description, the above functional modules are only described for exemplary purposes. In actual applications, the functions may be allocated to different functional modules according to specific needs, which means that the internal structure of the apparatus is divided to different functional modules to complete all or some of the above described functions. For a specific work process of the system, apparatus and unit described above, reference may be made to a corresponding process in the foregoing method embodiments, and the details are not described herein again.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the protection scope of the claims.

What is claimed is:

1. A method for recording and replaying a video of a terminal, comprising:
    at a server having one or more processors and a memory storing programs executed by the one or more processors:
    receiving screenshots that are sent by the terminal according to a first preset time interval and performance data of the terminal that is sent by the terminal according to a second preset time interval, the first preset time interval being less than the second preset time interval;
    synthesizing the screenshots received into video data that has a start time and an end time, wherein the synthesizing the screenshots received into video data that has a start time and an end time comprises: synthesizing the screenshots into streaming media data, wherein the streaming media data is used for continuously displaying pictures on a display screen of the terminal; and performing format conversion on the streaming media data, to generate video data that supports a video on demand service, wherein the video data has a start time and an end time; and
    playing, according to a playback time selected by a user, the video data and the performance data corresponding to the playback time.

2. The method according to claim 1, wherein the synthesizing the screenshots received into streaming media data comprises:

performing H264 encoding on the screenshots, to generate a bitstream in an H264 format; and encapsulating the bitstream in the H264 format, to obtain a Routing Table Maintenance Protocol (RTMP) bitstream.

3. The method according to claim 2, wherein the performing format conversion on the streaming media data, to generate video data that supports a video on demand service comprises:

performing format conversion on the RTMP bitstream, to generate video data in a flash video (FLU) format;

writing duration information of an FLU file to a header of the FLU file, wherein the duration information comprises a start time and an end time; and updating a value of duration of the FLU file according to the duration information.

4. The method according to claim 1, wherein the performing format conversion on the streaming media data, to generate video data that supports a video on demand service comprises:

separately creating a sub-process for each terminal, wherein the sub-process is used for performing format conversion on the streaming media data corresponding to each terminal.

5. The method according to claim 1, wherein the playing, according to a playback time selected by a user, the video data and the performance data corresponding to the playback time comprises:

loading the start time and the end time of the video data;

when playing each frame of the video data, acquiring, according to a time stamp of a current frame, performance data corresponding to the current time stamp; and displaying the current frame and the performance data corresponding to the current time stamp.

6. The method according to any one of claims 1 to 5, wherein the performance data is used for describing at least one of the following performance parameters:

central processing unit (CPU) usage, memory usage, traffic usage, power consumption, and the number of frames per second (FPS) of an image on the screen.

7. The method according to any one of claims 1 to 5, wherein the first time interval is greater than 0 seconds and less than or equal to 100 milliseconds; and the second time interval is greater than or equal to 2 seconds.

8. An apparatus for recording and replaying a video of a terminal, comprising:

one or more processors;

a memory; and one or more program modules stored in the memory and executed by the one or more processors, the one or more program modules comprising:

a receiving unit, configured to receive screenshots that are sent by the terminal according to a first preset time interval and performance data of the terminal that is sent by the terminal according to a second preset time interval, the first preset time interval being less than the second preset time interval;

a synthesizing unit, configured to synthesize the screenshots received by the receiving unit into video data that has a start time and an end time, wherein the synthesizing unit comprises: a streaming media synthesizing subunit, configured to synthesize the screenshots received by the receiving unit into streaming media data, wherein the streaming media data is used for continuously displaying pictures on a display screen of the terminal; and a format conversion subunit, configured to perform format conversion on the streaming media data obtained through synthesis by the streaming media synthesizing subunit, to generate video data that supports a video on demand service, wherein the video data has a start time and an end time; and a playback unit, configured to play, according to a playback time selected by a user, the video data obtained through synthesis by the synthesizing unit and the performance data received by the receiving unit and corresponding to the playback time.

9. The apparatus according to claim 8, wherein the streaming media synthesizing subunit is further configured to:

perform H264 encoding on the screenshots, to generate a bitstream in an H264 format; and encapsulate the bitstream in the H264 format, to obtain a Routing Table Maintenance Protocol (RTMP) bitstream.

10. The apparatus according to claim 9, wherein the format conversion subunit is further configured to:

perform format conversion on the RTMP bitstream, to generate video data in a flash video (FLU) format;

write duration information of an FLU file to a header of the FLU file, wherein the duration information comprises a start time and an end time; and update a value of duration of the FLU file according to the duration information.

11. The apparatus according to claim 8, wherein the synthesizing unit is further configured to:

separately create a sub-process for each terminal, wherein the sub-process is used for performing format conversion on streaming media data corresponding to each terminal.

12. The apparatus according to claim 8, wherein the playback unit further comprises:

a loading subunit, configured to load the start time and the end time of the video data;

an acquiring subunit, configured to: when each frame of the video data is played, acquire, according to a time stamp of a current frame, performance data corresponding to the current time stamp; and a display subunit, configured to display the current frame and the performance data corresponding to the current time stamp.

13. The apparatus according to any one of claims 8 to 12, wherein the performance data is used for describing at least one of the following performance parameters: central processing unit (CPU) usage, memory usage, traffic usage, power consumption, and the number of frames per second (FPS) of an image on the screen.

14. The apparatus according to any one of claims 8 to 12, wherein the first time interval is greater than 0 seconds and less than or equal to 100 milliseconds; and the second time interval is greater than or equal to 2 seconds.

15. A non-transitory computer readable storage medium having stored therein one or more instructions, which, when executed by a server, causes the server to:

receive screenshots that are sent by a terminal according to a first preset time interval and performance data of the terminal that is sent by the terminal according to a second preset time interval, the first preset time interval being less than the second preset time interval;

synthesize the screenshots into video data that has a start time and an end time, wherein the synthesizing the screenshots received into video data that has a start time and an end time comprises: synthesizing the screenshots into streaming media data, wherein the streaming media data is used for continuously displaying pictures on a display screen of the terminal; and performing format conversion on the streaming media data, to generate video data that supports a video on demand service, wherein the video data has a start time and an end time; and play, according to a playback time selected by a user, the video data and the performance data corresponding to the playback time.

* * * * *